United States Patent [19]

Venne

[11] 4,195,875
[45] Apr. 1, 1980

[54] PORTABLE ENTRANCEWAY CARPET FOR A RECREATIONAL VEHICLE

[76] Inventor: Phillip L. Venne, 725 N. Dangle Rd., Muskegon, Mich. 49442

[21] Appl. No.: 906,123

[22] Filed: May 15, 1978

[51] Int. Cl.² .............................................. B60J 11/00
[52] U.S. Cl. .................................... 296/1 F; 160/11; 296/163
[58] Field of Search ................. 296/1 F, 98, 143, 156, 296/162, 163; 280/164 A; 160/11

[56] References Cited

U.S. PATENT DOCUMENTS

| 1,719,055 | 7/1929 | Herzer | 296/98 X |
| 2,354,832 | 8/1944 | Ristine | 160/11 |
| 2,723,156 | 11/1955 | Stanziale | 296/98 X |
| 2,724,395 | 11/1955 | Valentine | 296/98 X |
| 2,876,471 | 3/1959 | Kraemer | 296/98 X |
| 3,146,824 | 9/1964 | Veilleux | 296/98 X |
| 3,563,594 | 2/1971 | London | 296/98 X |

Primary Examiner—Joseph F. Peters, Jr.
Assistant Examiner—Michael Mar
Attorney, Agent, or Firm—John A. Waters

[57] ABSTRACT

A portable entranceway carpet for a recreational vehicle comprises a carpet for the entranceway or doorway of a recreational vehicle and a storage container for the carpet mounted at a convenient location on the exterior of the vehicle, such that the carpet is stored outside the recreational vehicle at all times, and it is not necessary to bring the dirty carpet into the vehicle after it has been used in camping. In one aspect of the invention, the container is mounted under a door sill at the side of the recreational vehicle and includes a spring biased roller for supporting the carpet in the container. The roller can be unrolled from the container through a slot in the side thereof, and a latch mechanism holds the roller at a desired extended position. The latch mechanism is manually releasable to automatically retract the carpet into the container. Brushes mounted along the slot in the container automatically remove dirt and debris from the carpet when it is retracted into the container. The carpet has an outer portion adapted to be placed on the ground that is wider than the roller, the outer portion being foldable inwardly in order to roll the carpet on the roller.

5 Claims, 3 Drawing Figures

PORTABLE ENTRANCEWAY CARPET FOR A RECREATIONAL VEHICLE

BACKGROUND OF THE INVENTION

1. Field of the Invention

The present invention relates to a portable carpet for the entranceway of a recreational vehicle, wherein the carpet is stored in its own container mounted on the exterior of the vehicle.

2. Brief Description of the Prior Art

In camping with a recreational vehicle, it is customary to carry a section of carpet in the recreational vehicle for use on the ground at the doorway or entranceway to the vehicle when the vehicle is parked for camping purposes. Typically the carpet is a section of conventional carpet or rug or indoor-outdoor carpet wherein a fibrous pile surface is attached to a fabric backing.

One of the problems with employing entranceway carpets in recreational vehicles is that the carpets become extremely dirty and pick up a lot of debris as they lay on the ground at the doorway to the vehicle. When all of the camping equipment is packed back into the vehicle, it is also necessary to pick up the carpet and place it along with all of the other camping equipment in the vehicle. When the carpet is dirty or wet, the carpet is a mess to pick up and, when placed in the vehicle, gets the interior of the vehicle and all of the camping equipment dirty as well.

It is an object of the present invention to provide a portable camper carpet that includes its own storage container inconspicuously and conveniently mounted on the exterior of the vehicle such that it will no longer be necessary to pack a dirty camper carpet in the interior of the vehicle.

SUMMARY OF THE INVENTION

In accordance with the present invention, a portable entranceway carpet for a recreational vehicle comprises a section of carpet of a size sufficient for use on the ground at the doorway of a recreational vehicle; a hollow elongated container having an interior of sufficient size to house the carpet after it has been rolled up; mounting apparatus for attaching the container to the exterior of the recreational vehicle at a position that permits access to the container for storing and removing the carpet; and an opening in the container for removing the carpet from the container and replacing the carpet back in the container, the container providing storage room for the entranceway carpet outside the recreational vehicle so as to eliminate the need to bring the dirty carpet into the vehicle after it has been used in camping.

In one aspect of the present invention, the container is adapted to be mounted under a door sill at the side of the recreational vehicle and includes a roller rotatably mounted in the container for supporting the rolled up carpet in the container. An inner end of the carpet is attached to the roller such that rotation of the roller causes the carpet to be rolled on or off the roller. The container has an elongated slot along one side thereof for removing the carpet from the container and replacing the carpet in the container. The roller is spring biased to automatically retract the carpet into the container when desired, with the roller further including a latch for holding the carpet in any extended position desired. The latch is manually releasable to retract the carpet into the container.

The carpet includes an outer portion adapted to be laid on the ground when the carpet is unrolled from the roller. The inner end is of a width no longer than the roller, whereas the outer portion is wider than the roller. The outer portion is foldable inwardly to a width sufficient to be rolled up on the roller, with the walking surface of the carpet facing upwardly when the carpet is unrolled and unfolded.

Brushes can be formed along the edge of the slot in the side of the container so as to remove dirt and debris from the carpet when the carpet is retracted into the container.

As an alternative to the container with a retractable roller mounted under the door sill of the vehicle, the container can comprise a tubular container having an open end and a removable cap that fits over the open end to close the container. In this aspect, the carpet is manually insertable into the open end of the container in a rolled up condition after removal of the cap for storage purposes.

These and other features and advantages of the present invention are described in detail below and shown in the appended drawings in connection with a description of a preferred embodiment of the present invention.

DETAILED DESCRIPTION OF THE PREFERRED EMBODIMENT

Figure 1:
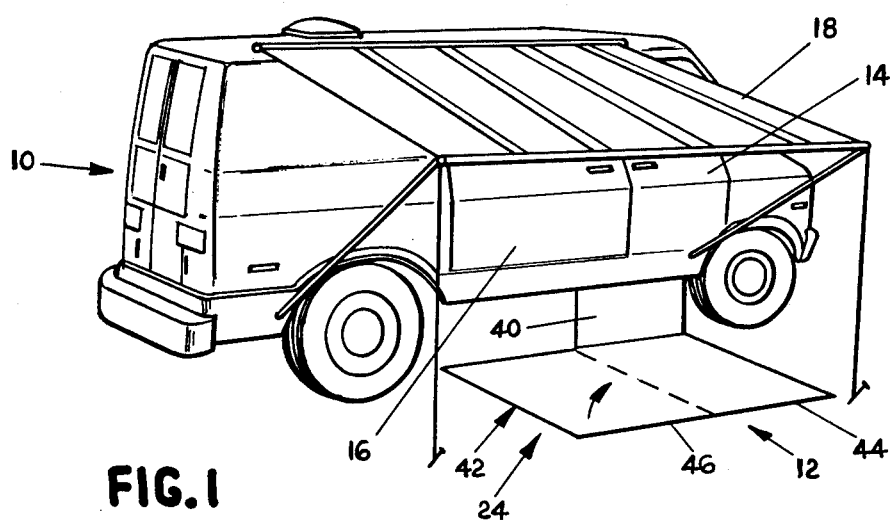
FIG. 1 is a perspective view of a recreational vehicle employing the portable entranceway carpet of the present invention.

Referring now to the drawings, the recreational vehicle 10 is shown in FIG. 1 employing a portable entranceway carpet 12 constructed in accordance with the present invention. Vehicle 10 includes a front door 14 providing access to the driver's compartment of the vehicle and a rear door 16 providing access to the rear portion or camper portion of the vehicle. An awning 18 is shown in erected position over the side of the recreational vehicle.

Figure 2:
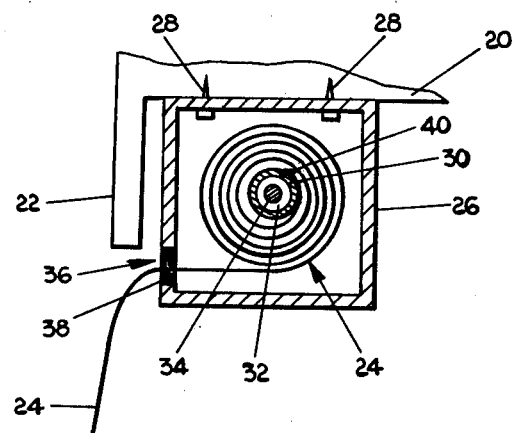
FIG. 2 is a cross-sectional end view of the entranceway carpet shown in FIG. 1, showing the interior of the container for the carpet with the carpet partially removed from the container.

As shown in more detail in FIG. 2, the side of the recreational vehicle 10 includes a floor or frame 20 and a side panel 22 that extends downwardly beyond the floor so as to form a substantial recess underneath the side of the vehicle. A recess of this nature is present in most if not all recreational vehicles.

The present invention includes a carpet 24 housed in a container 26 in the recess behind side panel 22 of the vehicle. Carpet 24 can be formed of any carpet or rug material or other material suitable for use as an entranceway carpet to a recreational vehicle. As used herein the term "carpet" will mean any material suitable for use for this purpose. Indoor-outdoor carpeting is desirable because of its close nap and weather-withstanding properties.

Container 26 is an elongated hollow container having a rectangular cross-section. The upper surface of the container abuts floor 20 of the vehicle and is fastened thereto by means of threaded fasteners 28. The container includes a roller 30 rotatably mounted approximately in the center of the container and extending longitudinally along the container. Roller 30 is spring biased toward a counterclockwise direction by means of a conventional coil spring retraction mechanism 32 of a type conventionally used in automatically retracting rollers of this type. A conventional latch mechanism 34 (shown schematically) is also incorporated in the roller mechanism in order to provide a means for locking the carpet at any desired position as it is extended from the container. The latch mechanism is manually releasable in a conventional manner in order to automatically retract the carpet back into the container.

The container includes a slot 36 in the side thereof facing the side of the vehicle. Slot 36 extends along the roller and provides an outlet for carpet 24. Brushes 38 can be mounted along the upper and lower edges of slot 36 in order to provide a means for brushing dirt and debris off the carpet as it is retracted into the container for storage purposes.

Carpet 24 is attached at an inner end 40 to roller 30 and is rolled in a clockwise direction on the roller. The inner end and the portion immediately adjacent the inner end of the carpet are of a width no wider than the length of the roller. The carpet also includes an outer portion 42 that is wider than the length of the roller. Outer portion 42 includes a first portion 44 that is the same width as inner portion 40 and an outwardly extending flap 46 that can be unfolded from a position on top of the portion 44 to expand the width of the entranceway carpet so that the carpet lies underneath the rear door 16 of the recreational vehicle, as well as under front door 14. Flap 46 can be folded back over onto portion 44 in order to retract the carpet into the container.

Figure 3:
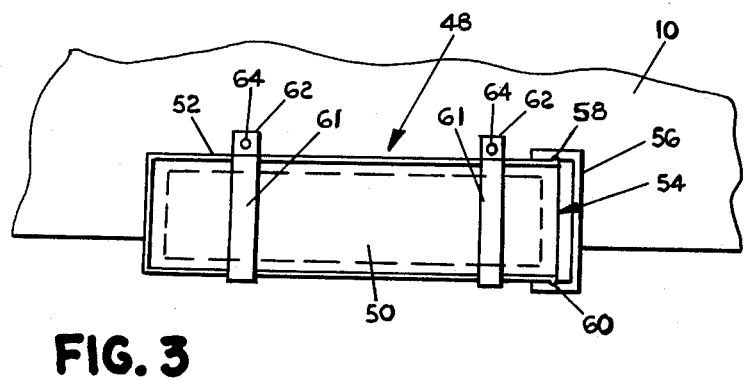
FIG. 3 is a side elevational view of a second embodiment of a portable entranceway carpet for a recreational vehicle.

Although the foregoing portable entranceway carpet construction employing a retractable roller underneath the door sill of the vehicle is believed to be the most desirable way of practicing the present invention, a less expensive portable carpet construction 48 shown in FIG. 3 still provides the advantage of exterior storage of the carpet in an unobtrusive location. Apparatus 48 includes a carpet section 50 that can be substantially the same as outer portion 42 of the embodiment described above. This carpet section is manually rolled into a cylindrical roll when the carpet is to be stored. Container 52 is provided for storing the carpet. Container 52 is a tubular container having an open end 54 and a cap 56 that fits over and encloses the open end. The cap can be fit over the end with a snap lock fit, with a bead 58 extending around the outer periphery of the open end of the container fitting into a groove 60 that encircles the interior periphery of cap 56.

Container 52 can be fastened in the same location as container 26 described above, or it can be fastened at any other desirable location in the vehicle. Another possible location would be beneath the front or back bumper of the vehicle. The container can be fastened to the vehicle by means of bands 61 that encircle the tubular container, with tabs 62 extending upwardly from the bands and fasteners 64 extending through openings in the tabs into suitable structural portions of the vehicle itself. Other means could be employed for fastening the container to the vehicle.

The container can be formed of any convenient material but is desirably formed of a modable plastic material because of the lightness of the material and the resistance of the material to deterioration. The size of the container need be no larger than a size sufficient to house the carpet when in a rolled up condition.

Various modifications may be made in the arrangements and details of construction of the embodiments disclosed herein without departing from the spirit and scope of the present invention.

The embodiments of the invention in which an exclusive property or privilege is claimed are defined as follows:

1. A portable entranceway carpet for a recreational vehicle comprising:

a section of carpet of a size sufficient for use as a walking surface on the ground at the doorway of a recreational vehicle, the carpet having a non-smooth surface texture such that the carpet serves as a means for removing dirt from shoes by scuffing the shoes on the carpet, the carpet further being formed of a material that is thick and durable enough to serve for repeated use as a walking surface;

a hollow elongated container having an interior of sufficient size to house the carpet after it has been rolled up; the container being adapted to be mounted under a door sill at the side of the recreational vehicle and including a roller rotatably mounted in the container that supports the rolled up carpet in the container, an inner end of the carpet being attached to the roller such that rotation of the roller causes the carpet to be rolled on or off the roller, the container having opening means for removing the carpet from the container and replacing the carpet in the container, the container further including means for rotating the roller to retract the carpet into the container when desired; and mounting means for attaching the container to the exterior of the recreational vehicle under the door sill.

2. A portable entranceway carpet according to claim 1 wherein the opening means in the container comprises elongated slot along one side thereof, the means for rotating the roller includes resilient biasing means for automatically retracting the carpet into the container when desired, the roller further including latch means for holding the carpet in any extended position desired, the latch means being manually releasable to retract the carpet back into the container.

3. A portable entranceway carpet according to claim 2 wherein the container and roller are of a predetermined width and the inner end of the carpet is of a width no wider than the length of the roller, the carpet further having an outer portion that is adapted to be laid on the ground when the carpet is unrolled from the roller, the outer portion being wider than the roller and being foldable inwardly to a width sufficient to be rolled up on the roller, the walking surface of the carpet facing upwardly when the carpet is unrolled and unfolded.

4. A portable entranceway carpet according to claim 3 wherein the longitudinal slot in the container includes brush means therealong for automatically brushing dirt and debris off the rug as it is retracted into the container.

5. A portable entranceway carpet according to claim 1 wherein the carpet comprises a fibrous pile material attached to a backing material.

* * * * *